(12) United States Patent
Acreman et al.

(10) Patent No.: US 11,537,002 B1
(45) Date of Patent: Dec. 27, 2022

(54) FULL COLOR REFLECTIVE DISPLAY INCLUDING A PHASE CHANGE MATERIAL

(71) Applicant: SHARP KABUSHIKI KAISHA, Sakai (JP)

(72) Inventors: Andrew Acreman, Oxford (GB); Nathan James Smith, Oxford (GB)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/347,973

(22) Filed: Jun. 15, 2021

(51) Int. Cl.
*G02F 1/1335* (2006.01)
*G02F 1/1337* (2006.01)
*G02F 1/1343* (2006.01)
*G02F 1/01* (2006.01)
*G02F 1/137* (2006.01)
*G02F 1/1333* (2006.01)

(52) U.S. Cl.
CPC ...... *G02F 1/133553* (2013.01); *G02F 1/0147* (2013.01); *G02F 1/1337* (2013.01); *G02F 1/13725* (2013.01); *G02F 1/133357* (2021.01); *G02F 1/133528* (2013.01); *G02F 1/133618* (2021.01); *G02F 1/134363* (2013.01); *G02F 2203/02* (2013.01)

(58) Field of Classification Search
CPC ......... G02F 1/133553; G02F 1/133357; G02F 1/133618
See application file for complete search history.

(56) References Cited

U.S. PATENT DOCUMENTS

| | | | | |
|---|---|---|---|---|
| 2001/0028421 | A1* | 10/2001 | Masazumi | G09G 3/36 349/74 |
| 2002/0027630 | A1* | 3/2002 | Yamada | G02F 1/133753 349/123 |
| 2003/0047450 | A1* | 3/2003 | Yang | G01N 27/403 204/403.01 |
| 2005/0161589 | A1* | 7/2005 | Kim | B82Y 20/00 250/216 |
| 2018/0284509 | A1* | 10/2018 | Chanda | G02B 5/008 |
| 2021/0223638 | A1* | 7/2021 | Gong | G02F 1/133555 |

* cited by examiner

*Primary Examiner* — Lucy P Chien
(74) *Attorney, Agent, or Firm* — ScienBiziP, P.C.

(57) ABSTRACT

A reflective display apparatus is provided. The reflective display apparatus includes a textured sub-micron metal film textured in a periodic manner, a phase change material (PCM) layer, and a phase change control layer that is configured to change reflection properties of the textured sub-micron metal film by causing the PCM to switch between at least two of a plurality of phases.

21 Claims, 12 Drawing Sheets

FULL COLOR REFLECTIVE DISPLAY INCLUDING A PHASE CHANGE MATERIAL

FIELD

The present disclosure generally relates to reflective displays illuminated by ambient light, and more particularly to reflective displays having reflective thin metal films and phase change materials for color variability. Full color reflective displays having thin metal films and phase change materials may be used in a variety of display applications, for example, as a replacement for high-resolution reflective multi-color liquid crystal (LC) displays. The present disclosure further relates to methods of manufacturing the reflective displays.

BACKGROUND

Liquid crystal display (LCD) devices typically comprise an array of LCD pixels, which are in turn comprised of a series of individual sub-pixels. Each LCD sub-pixel includes an LC layer disposed between two electrodes. When voltage is applied across the sub-pixel's LC layer, it results in a change of orientation in the LCs, thus changing the opacity of the sub-pixel (i.e., turning the sub-pixel 'on' or 'off'). LCDs may be illuminated with a backlight or be reflective. Reflective LCD sub-pixels typically incorporate a metal film behind each sub-pixel for reflecting ambient light.

To achieve a full color LCD, an array of individual red, green, and blue (RGB) sub-pixels are used for each full color LCD pixel, the combination of sub-pixels enabling each pixel to display a full range of colors in the visible spectrum by activating individual sub-pixels, or a combination thereof. One possible architecture for reflective color LCDs is to place a textured or patterned plasmonic thin metal film behind the LC layer of each sub-pixel to reflect ambient light in a particular color.

In plasmonics, a thin metal film can be formed having a subwavelength three-dimensional surface pattern corresponding to a particular refractive index. The refractive index of a particular pattern causes the thin metal film to absorb certain wavelengths of light, while reflecting others. Thus, a plasmonically patterned thin metal film can be made to only reflect a particular color of ambient light, such as red, green, or blue for reflective color LCD sub-pixels. For example, Au (gold) metal normally absorbs light in the blue spectrum and reflects yellow, but an Au thin metal film can be patterned to appear (i.e., reflect) bright red if the patterning wavelength interval is around 500 nm.

A fundamental problem with the above-described reflective color LCDs is a lack of reflective luminance. Since individual RGB display pixels typically comprise three sub-pixels each—one for each RGB color—at any given time, there are non-reflecting unused sub-pixels, and upwards of two thirds of ambient light may be lost (i.e., not reflected). For example, a typical sheet of white paper reflects approximately 90% of ambient light, whereas an RGB reflective LCD pixel having individually colored sub-pixels may reflect only about 30% of ambient light. Therefore, reflective color LCDs frequently appear dim. One solution designed to solve this problem is to enable the sub-pixels to change color.

For example, changes in LC orientation in the LC layer may be used to modify the refractive index in the area of a patterned reflective thin metal film. An LC layer may thus alter the reflection properties of the thin metal film, such that different colors may be reflected depending on the LC layer state. By altering the voltage across the LC layer, a reflective, color-changing surface capable of producing some range of RGB color may be produced as a function of voltage in a single sub-pixel nanostructure.

One problem with the above-described approach is that the refractive index change in an LC layer is relatively small, so the available shift in color is also relatively small. Thus, such LCDs are incapable of producing a full RGB color spectrum in individual sub-pixels. Consequently, the three sub-pixels are still required to produce the full color RGB pixels needed in such a reflective color LCD, with the attendant loss of luminance discussed previously. Additionally, to produce a black state in the LCD screen, another LCD is required on top of the color pixels.

Thus, there is a need for an improved high-definition reflective color display that maximizes luminance, while providing full variable color capability.

SUMMARY

A reflective display apparatus may include, from the viewing side, a textured sub-micron metal film textured in a periodic manner, a phase change material (PCM) layer, and a phase change control layer, wherein the phase change control layer is configured to change reflection properties of the textured sub-micron metal film by causing the PCM layer to switch between at least two of a plurality of phases.

The phase change control layer may include an electrode layer, with the PCM switchable between at least one amorous state and at least one crystalline state when an electric potential is applied between the electrode layer and the textured sub-micron metal film. The phase change control layer may also include a microheater. In any of these implementations, a dielectric layer may be deposed on the viewing side of the textured sub-micron metal film.

In any of the previous implementations, the phase change control layer may be topographically flat at the interface of the PCM layer and the phase change control layer, and at the interface of the PCM layer and the textured sub-micron metal film layer, wherein the phase change material layer may conform to a topology of the textured sub-micron metal film.

The phase change control layer may also be textured in a periodic manner that conforms to the textured sub-micron metal film. A planarization layer may be deposed between the phase change control layer and the PCM layer, wherein the planarization layer may be topographically flat at an interface of the planarization layer and the phase change control layer, and at the interface of the planarization layer and the phase change control layer, the planarization layer may conform to a topology of the submicron thin metal layer.

In any of the previous implementations, the textured sub-micron metal film may be textured in a periodic manner, and a height variation of the textured sub-micron metal film in a first direction (z-direction) may have a first period in a second direction (x-direction) perpendicular to the first direction. Additionally, the textured sub-micron metal film may be textured in a periodic manner, wherein the height variation of the textured sub-micron metal film in the first direction (z-direction) may have a second period in a second direction (x-direction) perpendicular to the first direction, and the height variation of the textured sub-micron metal film in the first direction (z-direction) may have a second period in a third direction (y-direction) perpendicular to the first and second directions. The first period may be different from the second period. Additionally, the first period may be the same as the second period.

In any of the previous implementations, the apparatus may include a liquid crystal display (LCD) on a viewing side of the reflective display apparatus. Additionally, the apparatus may include a polarizer on the LCD. Additionally, the apparatus may include a guest host liquid crystal display (LCD) on a viewing side of the reflective display apparatus.

In one implementation, the apparatus may include an on-cell LCD structure on a viewing side of the reflective display apparatus, wherein the on-cell LCD structure includes a polarizer, a first electrode substrate, a top alignment layer, a liquid crystal (LC) layer, a bottom alignment layer, and a second electrode layer, and wherein liquid crystals of the LC layer are reoriented via the application of a voltage between the first and second electrode layers.

In another implementation, the apparatus may include an on-cell LCD structure on a viewing side of the reflective display apparatus, wherein the on-cell LCD structure includes a polarizer, a top electrode substrate, a first electrode layer a top alignment layer, a liquid crystal (LC) layer, and a bottom alignment layer, and wherein liquid crystals of the LC layer are reoriented via the application of a voltage between the first electrode layer and the textured sub-micron metal film.

In yet another implementation, the apparatus may include an on-cell guest host LCD structure on a viewing side of the reflective display apparatus, wherein the on-cell guest host LCD structure includes a top electrode substrate, a first electrode layer, a top alignment layer, a liquid crystal (LC) layer, a bottom alignment layer, and a second electrode layer, and wherein the LC layer is doped with a dichroic dye and liquid crystals of the LC layer are reoriented via the application of a voltage between the first and second electrode layers.

In yet another implementation, the apparatus may include an on-cell LCD structure on a viewing side of the reflective display apparatus, wherein the on-cell LCD structure includes a polarizer, a top electrode substrate, a first electrode layer, a top alignment layer, a liquid crystal (LC) layer, and a bottom alignment layer, and wherein the LC layer is doped with a dichroic dye and liquid crystals of the LC layer are reoriented via the application of a voltage between the first electrode layer and the textured sub-micron metal film.

In yet another implementation, the apparatus may include an on-cell in-plane-switching (IPS) type LCD structure on a viewing side of the reflective display apparatus, wherein the on-cell IPS type LCD structure includes a polarizer, a top electrode substrate, a first electrode layer, an electrical insulation layer, a second electrode layer, a top alignment layer, a liquid crystal (LC) layer, and a bottom alignment layer, and wherein liquid crystals of the LC layer are reoriented via the application of a voltage between the first and second electrode layers. In yet another implementation, the apparatus includes an on-cell IPS guest host type LCD structure on a viewing side of the reflective display apparatus, wherein the on-cell IPS guest host LCD structure includes a top electrode substrate, a first electrode layer, electrical insulation layer, a second electrode layer, a top alignment layer, a liquid crystal (LC) layer, and a bottom alignment layer, wherein the LC layer is doped with a dichroic dye and liquid crystals of the LC layer are reoriented via the application of a voltage between the first and second electrode layers.

In any of the previous implementations, the PCM layer may include germanium-antimony-tellurium (GeSbTe).

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DESCRIPTION

Figure 1:
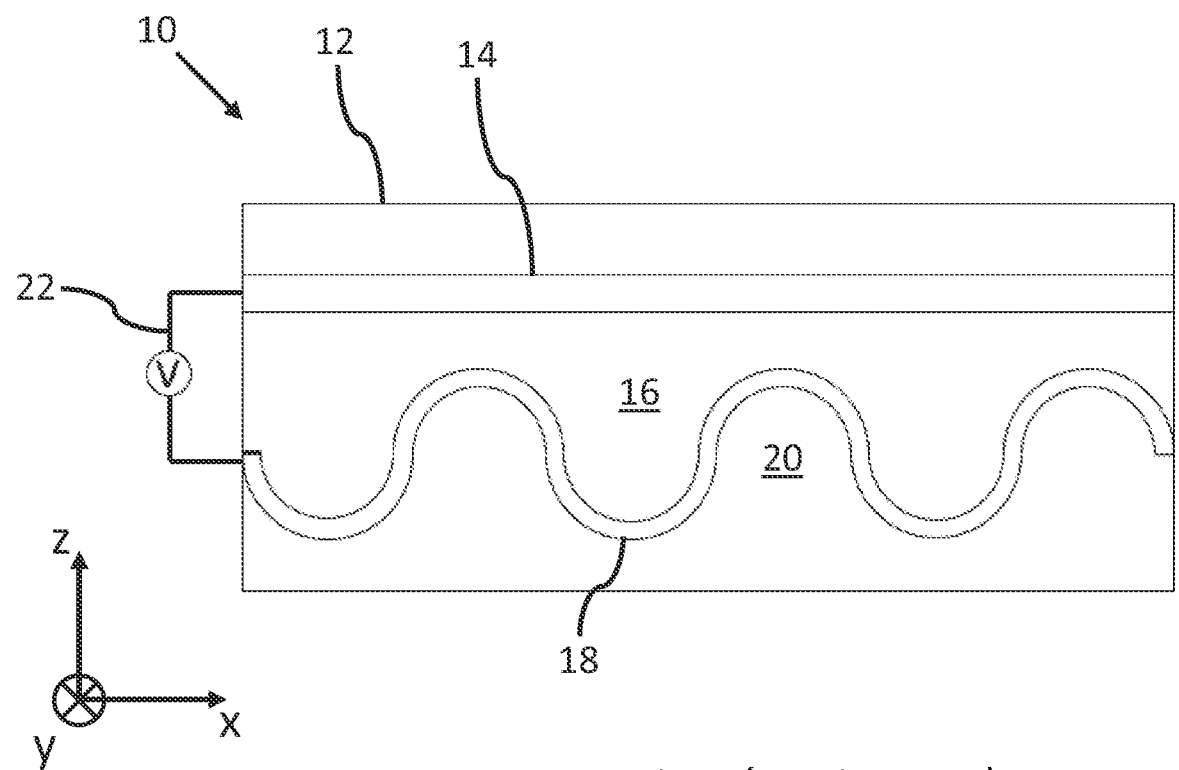
FIG. 1 illustrates a schematic cross-sectional view of a related art color switching reflective LCD along a first axis.

The following description contains specific information pertaining to exemplary implementations of the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not shown) by numerals in the exemplary figures. However, the features in different implementations may differ in other respects, and thus shall not be narrowly confined to what is shown in the figures.

The phrases "in one implementation," or "in some implementations," may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates an open-ended inclusion or membership in the so-described combination, group, series and the equivalent.

Disclosed is a full color reflective display that can produce the full spectrum of visible colors (e.g., RGB) in individual sub-pixels of a pixel array. Exemplary fabrication methods are disclosed which may provide the full color reflective display, possibly including an LCD device for providing a black state.

The display may use a textured metal film to produce colored reflection from ambient radiation. Instead of using an LC layer to modify the refractive index around the textured thin metal film, the instant display, as will be described in more detail below, may use a PCM (such as GeSbTe, for example) to change the refractive index around the thin metal film.

Phase change materials have at least two distinct solid states: an amorphous state and a crystalline state, which have different real and imaginary refractive indexes. The refractive index change is large in comparison to LC, and in contrast to LC, has changes in both the real and imaginary components. Due to this large change in refractive index, a larger modulation in the reflection properties, and consequently a larger change in color, can be achieved.

Figure 2:
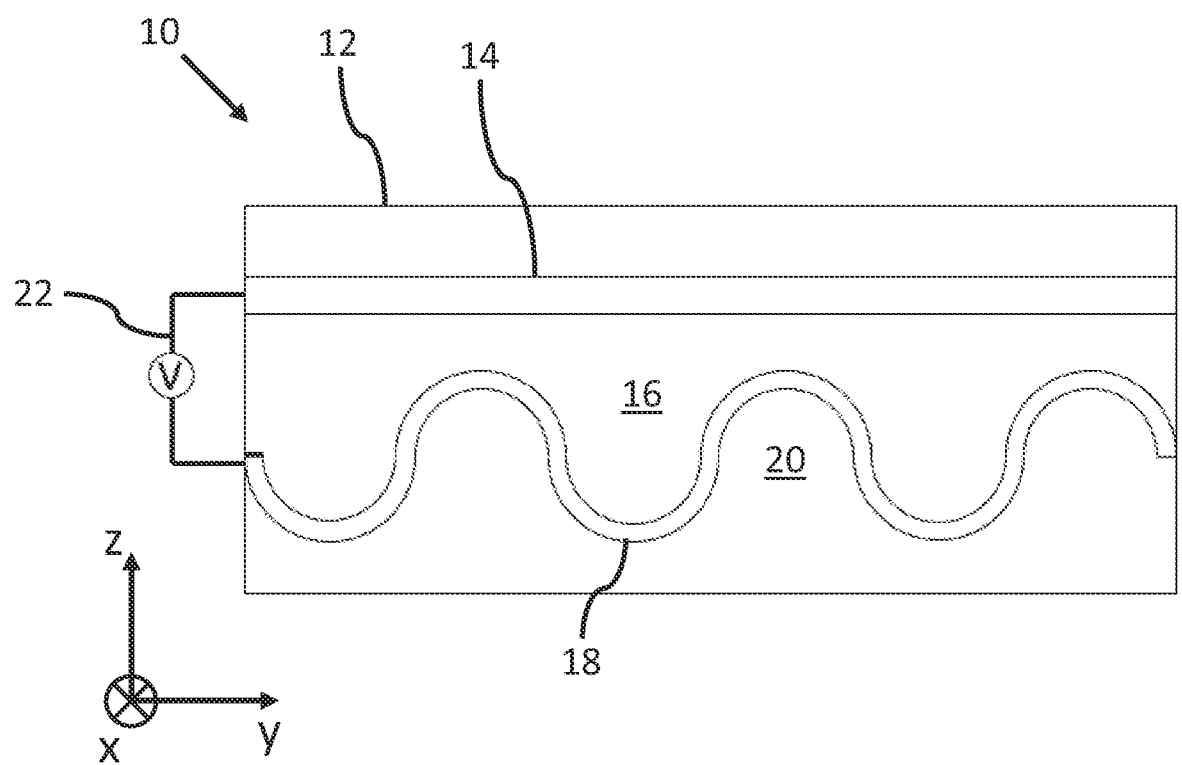
FIG. 2 illustrates a schematic cross-sectional view of a related art color switching reflective LCD along a second axis.

FIGS. 1 and 2 illustrate a related art LCD device 10. Particularly, FIG. 1 illustrates a schematic cross-sectional view of a related art color switching reflective LCD 10 along a first axis, while FIG. 2 illustrates a schematic cross-sectional view of the related art color switching reflective LCD 10 along a second axis. The LCD device 10 may represent a single sub-pixel in a color reflective LCD pixel array. The LCD device 10 includes a top substrate 12, an electrode 14, an LC material 16, a patterned reflective metal layer 18, and a bottom substrate 20. FIG. 1 shows a cross section of the LCD device 10 along an x-axis, while FIG. 2 shows a cross section of the LCD device 10 along a y-axis, perpendicular to the x-axis. Thus, the patterned reflective metal layer 18 may be characterized as having a three-dimensionally sinusoidal subwavelength pattern across its surface. Due to this characteristic, the patterned reflective metal layer 18 reflects a particular color of ambient light, while the LC material 16 above the reflective metal layer 18 can be switched from optical state to another by applying a voltage to it.

In FIGS. 1 and 2, a voltage 22 is applied between the electrode 14 and the reflective metal layer 18. The voltage 22 causes a change in the LC material 16 away from its resting state. For example, the voltage may cause a change in orientation of the LCs in the LC material 16, thus slightly altering the refractive index of the LC material 16 near the reflective metal layer 18. This, in turn, changes the dielectric environment of light striking the reflective metal layer 18, which may change its reflection properties, and consequently the observed reflected color. For example, the LCD device 10 may comprise a pixel having a reflective metal layer 18 appearing red. By applying the voltage 22 to the pixel, the light that is reflected from the reflective metal layer 18 (e.g., through the LC material 16) may appear purple. Since the LC material 16 only switches between two states, the LCD device 10 only switches between two colors. The resting state of the LC material 16 is dictated by alignment layers (not shown), which may be incorporated onto the top substrate 12, onto the reflective metal layer 18, or onto both.

Figure 3:
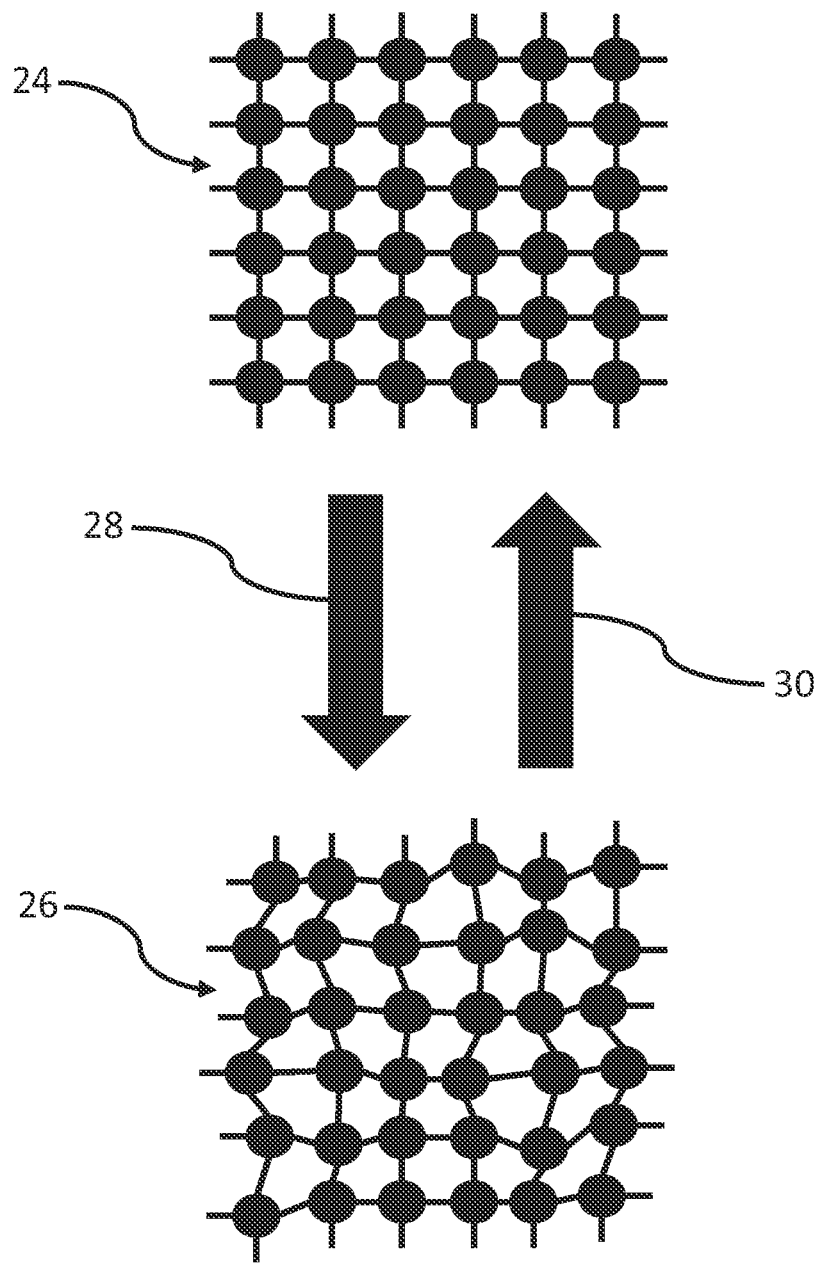
FIG. 3 illustrates a diagram of a related art PCM switching between a crystalline phase and an amorphous phase.

Referring to FIG. 3, a related art phase change material (PCM) 24/26 is shown in its crystalline state 24 and its amorphous state 26. The crystalline state 24 may be switched to the amorphous state 26 using a first heat pulse 28, and the amorphous state 26 may be switched back to the crystalline state 24 using a second heat pulse 30. One aspect of changing the PCM 24/26 from the crystalline state 24 to the amorphous state 26 (and vice versa) is that the refractive index of the PCM 24/26 also changes. There exist certain PCMs that exhibit very large changes in their respective refractive indexes when they switch between one or more crystalline states and one or more amorphous states (e.g., significantly more than that exhibited by LC material 16 of LCD device 10). Additionally, certain PCMs may switch between multiple states, for example three or more states, each with a substantially different refractive index.

Figure 4:
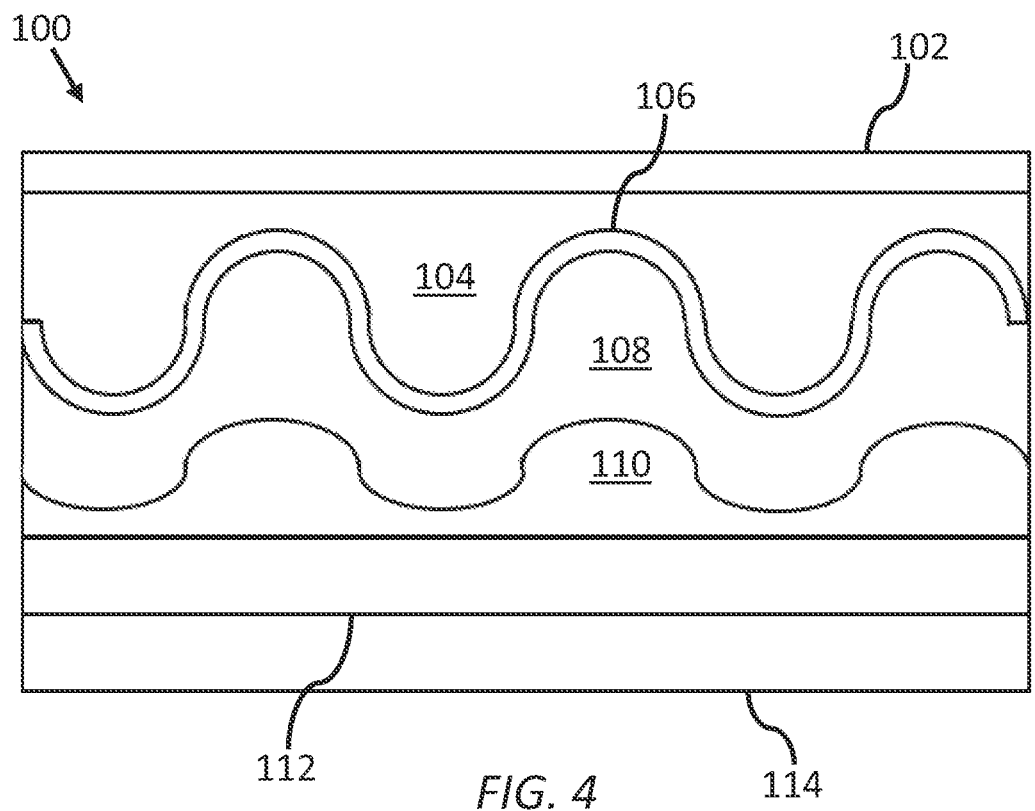
FIG. 4 illustrates a schematic cross-sectional view of a full color reflective display in accordance with an example implementation of the present disclosure.

FIG. 4 illustrates a schematic cross-sectional view of a full color reflective display 100 in accordance with an example implementation of the present disclosure. The display 100 includes a top substrate layer 102, a dielectric layer 104, a textured sub-micron metal film 106 formed into a repeating (e.g., sinusoidal) pattern, a PCM layer 108, a planarization layer 110, a microheater layer 112 serving as a phase change control layer, and a bottom substrate layer 114. The dielectric layer 104 may be on a viewing side of the textured sub-micron metal film 106. The microheater layer 112 (i.e., phase change control layer) may be topographically flat at the interface of the planarization layer 110 and the microheater layer 112. At an interface between the PCM layer 108 and the textured sub-micron metal film 106, the PCM layer 108 may conform to the topology of the textured sub-micron metal film 106.

The textured sub-micron metal film 106 is textured in a periodic manner, and the repeating sinusoidal pattern of the textured sub-micron metal film 106 is on the order of a wavelength of light, generally in a range between 100 and 1000 nanometers, but the range may be larger (e.g., between 50 nanometers and 2000 nanometers) in some embodiments. The height of the sinusoidal pattern is generally in a range between 10 nanometers and 100 nanometers or larger ranges, such as between 1 nanometer and 1000 nanometers, in some embodiments. In one contemplated implementation, the PCM layer 108 may comprise GeSbTe (germanium-antimony-tellurium), although other known PCMs may be used according to preference.

A heat pulse from the microheater layer 112 switches the PCM layer 108 from a crystalline state to an amorphous state (or between crystalline states, or between amorphous states as discussed above) and vice versa, as illustrated in FIG. 3. That action changes the dielectric environment of light striking the textured sub-micron metal film 106, thereby changing its reflection properties, and consequently the observed reflected color. Because this change in the refractive index of the PCM layer 108 is relatively large, it results in a large change in the refractive index of the textured sub-micron metal film 106 (and thus a large difference in reflected colors can be achieved). The speed of the switching pulses from the microheater layer 112 may be in the range of zeros pulses per second and one thousand pulses per second, according to preference.

In different implementations, the microheater layer 112 may be thin film transistor (TFT) addressed or directly addressed. The planarization layer 110 is incorporated into the structure to account for surface variations in the sinusoidal pattern of the textured sub-micron metal film 106, for the microheater layer 112 to be flat. In other implementations, as discussed below, the planarization layer 110 may be omitted altogether.

A thin film periodic structure can be formed as a linear Fourier series of sinusoidal waves along two axes, and individual Fourier series can be constructed with different magnitudes and wave factors. For example, in basic example full color reflective display 100 illustrated in FIG. 4 (similar to the LCDs shown in FIGS. 1 and 2), the sinusoidal height variation of the textured sub-micron metal film 106 may be described by a linear sum of sinusoidal waves equally in the 'x' direction and in the 'y' direction. This is described by the following formulas:

$$h_{106}(x) \propto \sum_{n=0}^{\infty} a_n \sin(nkx) + b_n \cos(nkx)$$

and $$h_{106}(y) \propto \sum_{n=0}^{\infty} a_n \sin(nky) + b_n \cos(nky)$$

Where $h_{106}(x)$ is the spatial variation of the height of the textured sub-micron metal film 106 in the x direction, and $h_{106}(y)$ is the spatial variation of the height of the textured sub-micron metal film 106 in the y direction. In each instance, $a_n$ is the magnitude of the sinusoidal component of a wave with the wave vector nk (with x or y being the spatial distance), and $b_n$ is the magnitude of the cosinusoidal component of a wave with a wave vector nk (also with x or y being the spatial distance).

Figure 5:
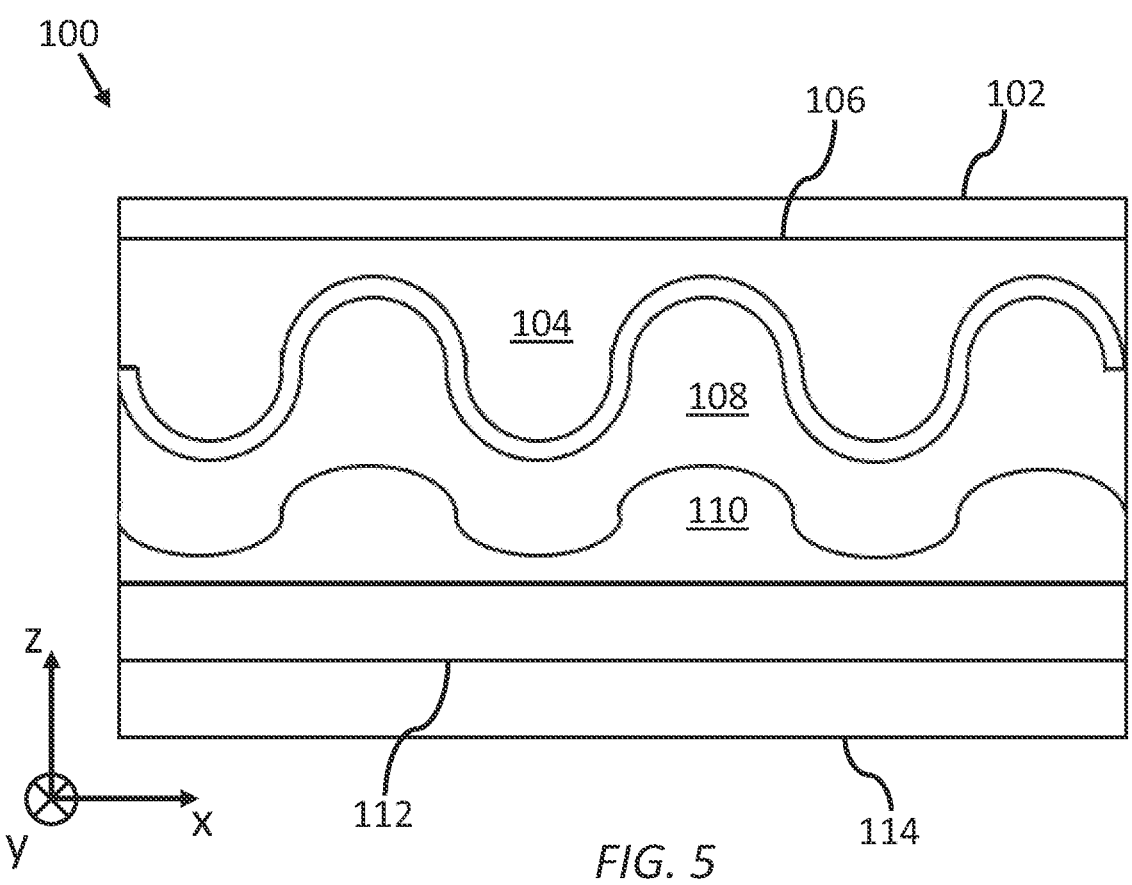
FIG. 5 illustrates a schematic cross-sectional view of the full color reflective display with an anisotropic metal film along a y-axis in accordance with an example implementation of the present disclosure.
Figure 6:
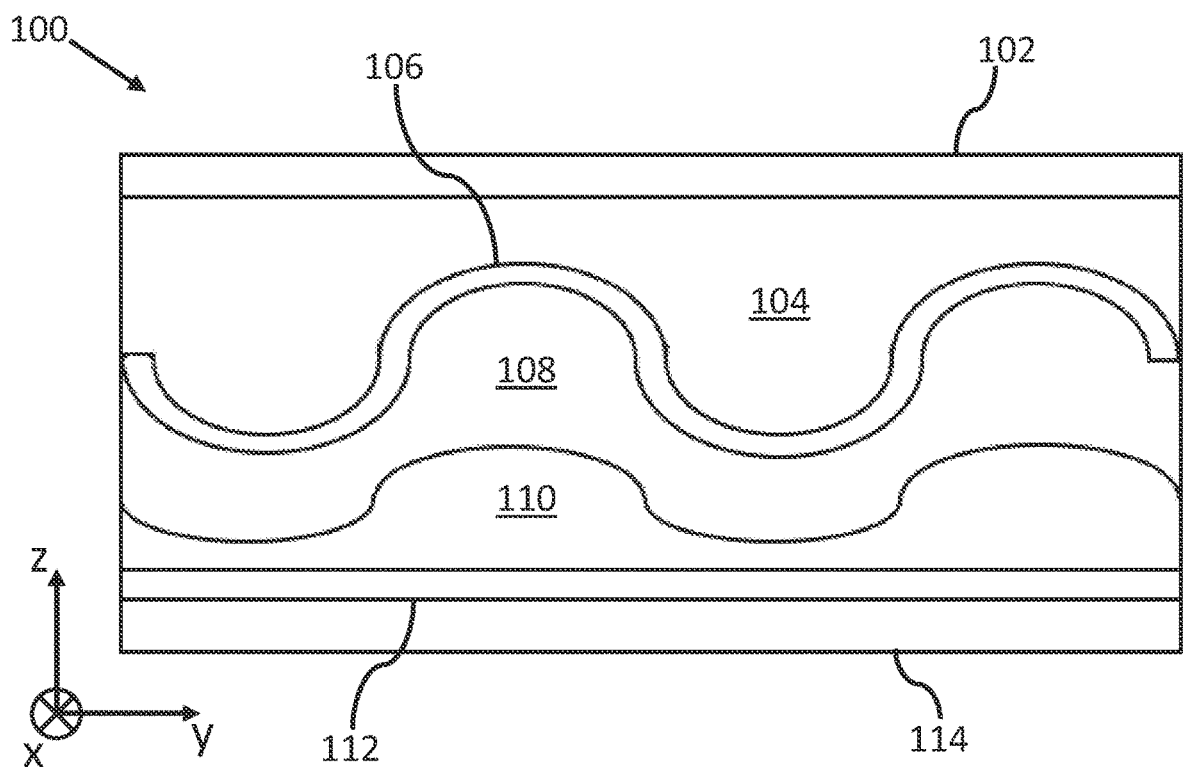
FIG. 6 illustrates a schematic cross-sectional view of the full color reflective display with an anisotropic metal film along an x-axis in accordance with an example implementation of the present disclosure.

FIGS. 5 and 6 illustrate that, in various other implementations, the sinusoidal period may not be the same in both directions across the textured sub-micron metal film 106. Particularly, FIG. 5 illustrates a schematic cross-sectional view of a color reflective display 100 with an anisotropic metal film along a y-axis in accordance with an example implementation of the present disclosure, while FIG. 6 illustrates a schematic cross-sectional view of the same full color reflective display 100 having an anisotropic metal film along an x-axis in accordance with an example implementation of the present disclosure. Thus, a modification of the basic example may be constructed, wherein the period in the 'x' direction and the 'y' direction are different. This alternative implementation is described by the following formula:

$$h_{106}(x, y) \propto \sum_{n=0}^{\infty} (a_{xn}\sin(nk_x x) + b_{xn}\cos(nk_x x) + a_{yn}\sin(nk_y y) + b_{yn}\cos(nk_y y))$$

FIGS. 5 and 6 show an example of this variation (i.e., illustrating the same reflective display in the 'x' and 'y' directions), however the period in the 'x' direction shown in FIG. 5 is less than the period in the 'y' direction shown in FIG. 6. Altering the period in this manner has the advantage of providing different view angle properties in the 'x' and 'y' directions.

Figure 7:
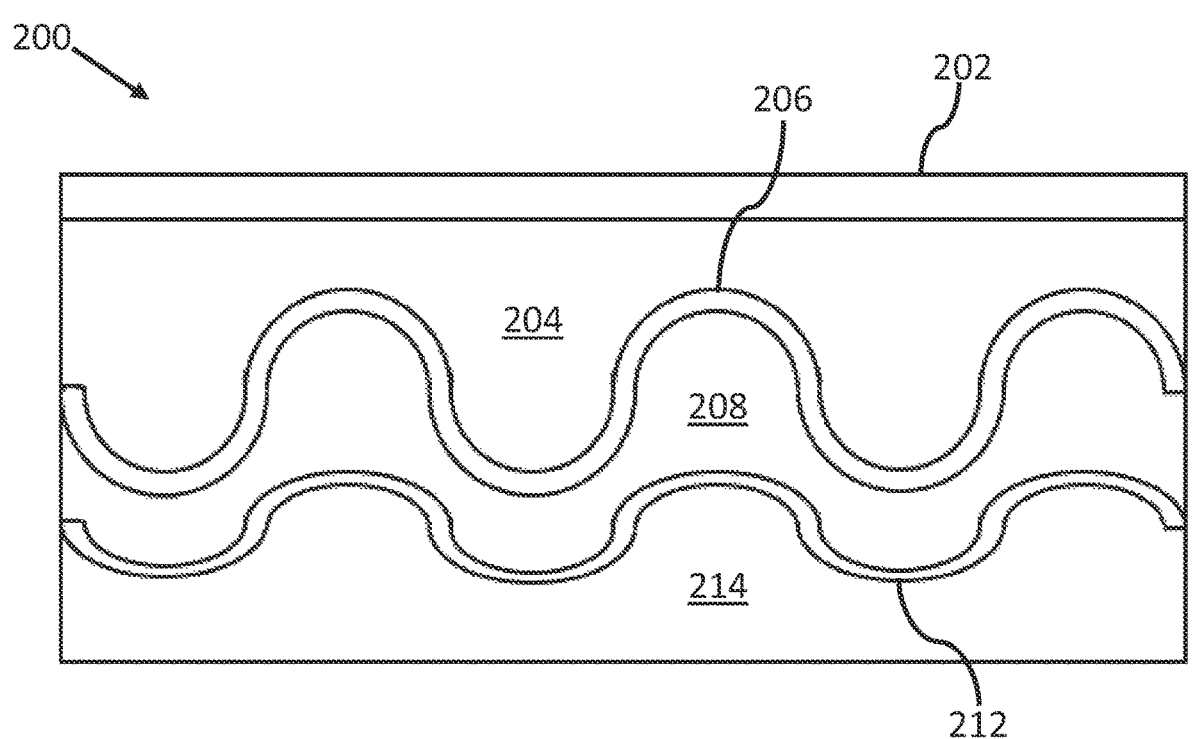
FIG. 7 illustrates a schematic cross-sectional view of the full color reflective display having a textured heater in accordance with an example implementation of the present disclosure.

FIG. 7 illustrates a schematic cross-sectional view of the full color reflective display having a textured heater in accordance with another exemplary implementation of the present disclosure. In FIG. 7, a second implementation full color reflective display 200 is shown, having a top substrate layer 202, a dielectric layer 204, a textured sub-micron metal film 206, a PCM layer 208, a patterned microheater layer 212, and a planarizing bottom substrate 214. In this implementation, no independent planarization layer is needed due to the planarizing bottom substrate 214. The advantage of this implementation, wherein the microheater layer 212 has a sinusoidal pattern as well as the textured sub-micron metal film 206, is to improve switching in the PCM layer 208. In this implementation, the planarizing bottom substrate 214 is deposited first, incorporating the sinusoidal pattern, to which the microheater layer 212, the PCM layer 208, and the textured sub-micron metal film 206 will conform when deposited.

Figure 8:
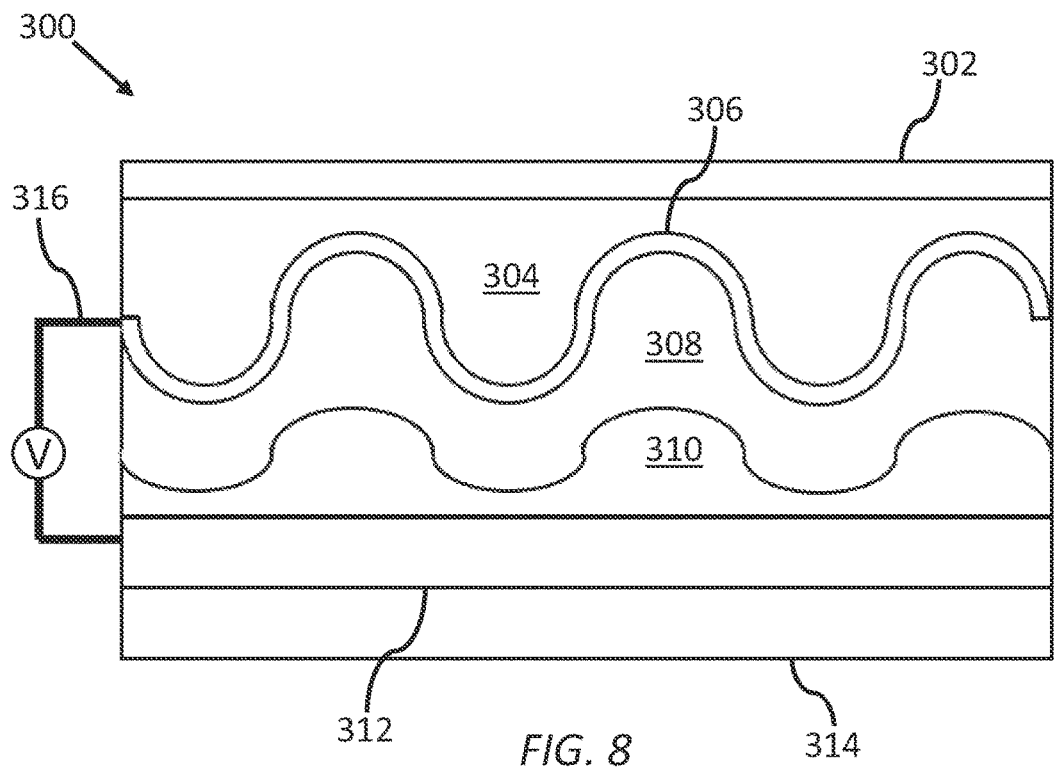
FIG. 8 illustrates a schematic cross-sectional view of the full color reflective display having electrical switching in accordance with an example implementation of the present disclosure.

FIG. 8 illustrates a schematic cross-sectional view of the full color reflective display having electrical switching in accordance with another exemplary implementation of the present disclosure. In FIG. 8, a third implementation full color reflective display 300 is shown, having a top substrate 302, a dielectric layer 304, a textured sub-micron metal film 306 which serves as a first electrode, a PCM layer 308, a planarization layer 310, a second electrode layer 312 (in lieu of a microheater), and a bottom substrate 314. In this implementation, a voltage 316 is applied to the textured sub-micron metal film 306 and the second electrode layer 312, which is another way of causing a phase change in the PCM layer 308. Although electrical switching may not be as effective as microheater switching for the PCM layer 308, it may have the advantage of simpler fabrication.

Figure 9:
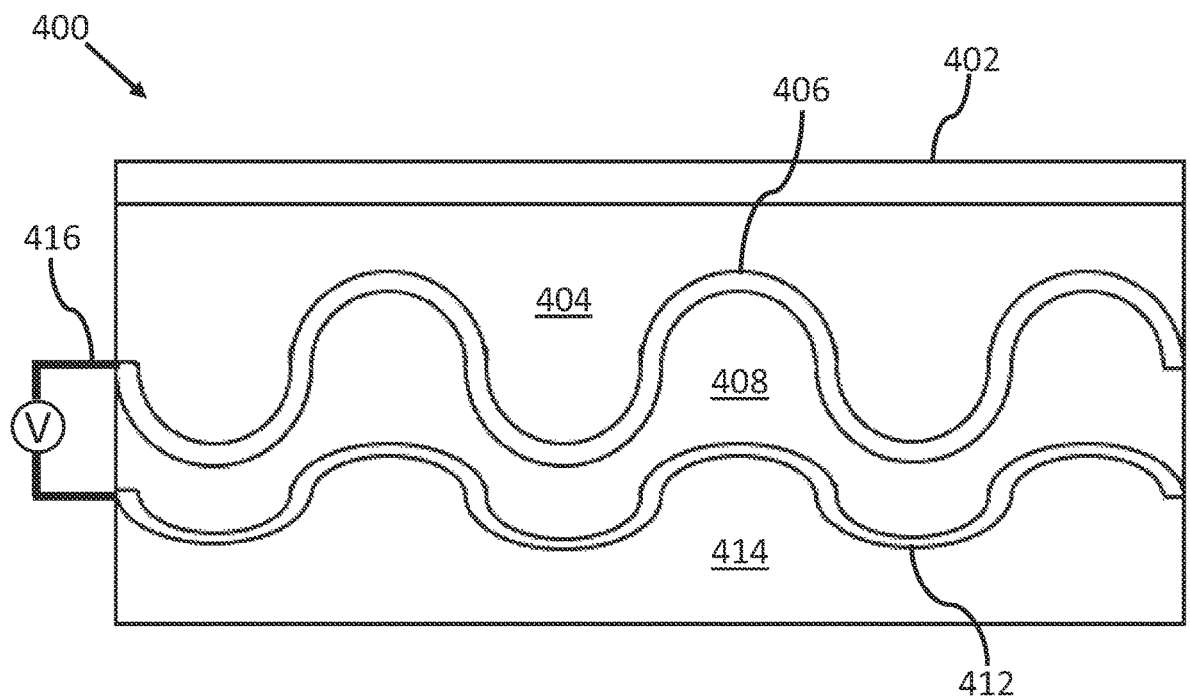
FIG. 9 illustrates a schematic cross-sectional view of the full color reflective display having textured electrical switching in accordance with an example implementation of the present disclosure.

FIG. 9 illustrates a schematic cross-sectional view of the full color reflective display having textured electrical switching in accordance with another exemplary implementation of the present disclosure. In FIG. 9, a fourth implementation full color reflective display 400 is shown having a top substrate layer 402, a dielectric layer 404, a textured sub-micron metal film 406 which serves as a first electrode, a PCM layer 408, a patterned second electrode layer 412 (in lieu of a microheater), and a patterned bottom substrate layer 414. Like the embodiment shown in FIG. 8, a voltage 416 is applied to the textured sub-micron metal film 406 and the patterned second electrode layer 412, which is another way of causing a phase change in the PCM layer 408. In this implementation, like the second implementation shown in FIG. 7, there is no separate planarization layer between the planarizing bottom substrate layer 414 and the patterned second electrode layer 412. This may improve switching of the PCM layer 408. The advantage of this implementation, with the second electrode layer 412 having a sinusoidal pattern and adjoining the PCM layer 408, is to improve switching in the PCM layer 408. In this implementation, the planarizing bottom substrate layer 414 is deposited first, incorporating the sinusoidal pattern, to which the patterned second electrode layer 412, the PCM layer 408, and the textured sub-micron metal film 406 will conform when deposited.

FIGS. 10-15 illustrate the first implementation full color reflective display 100 with various implementations having a supplementary LCD structure applied on top of the viewing side of the reflective display 100. A supplementary LCD structure is useful to achieve a black state in the display, and/or may include an "in-cell" or "on-cell" configuration.

Figure 10:
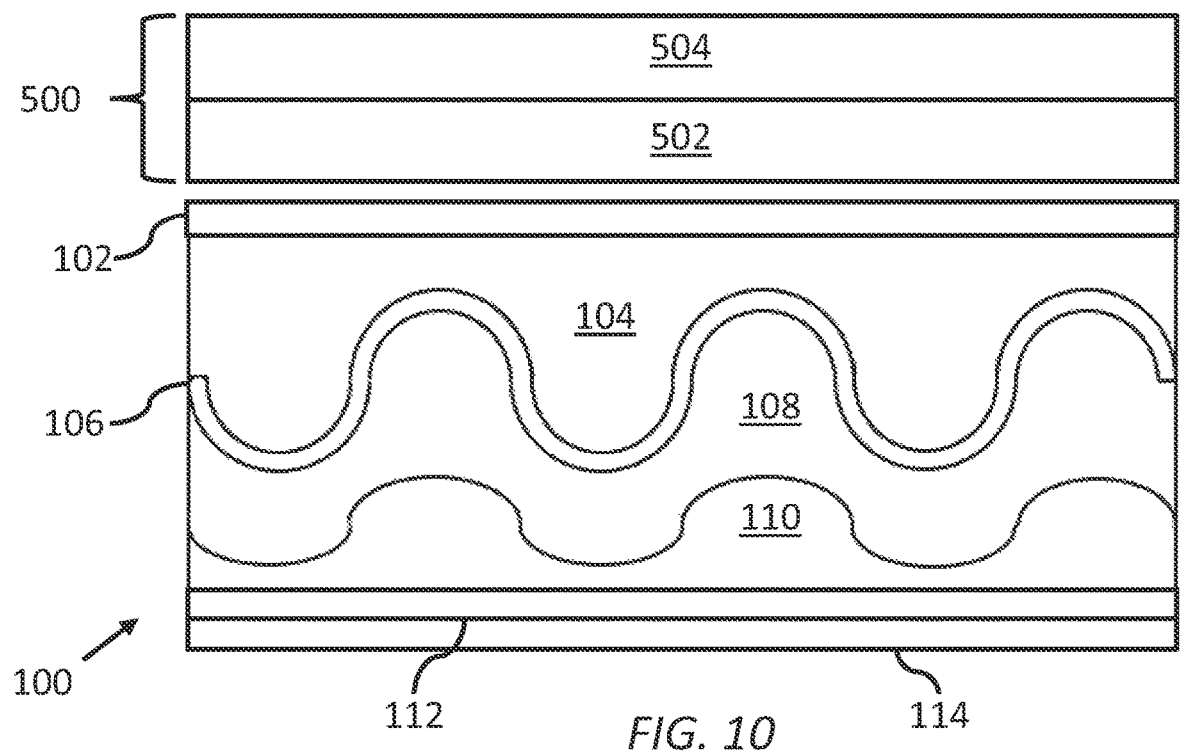
FIG. 10 illustrates a schematic cross-sectional view of the full color reflective display with an LCD placed on the viewing side in accordance with an example implementation of the present disclosure.

FIG. 10 illustrates a schematic cross-sectional view of the full color reflective display 100 with an LCD structure 500 placed on the viewing side in accordance with an example implementation of the present disclosure. In FIG. 10, the supplementary LCD structure 500 is placed over the reflective display 100 to achieve a black state in the reflective display 100. The LCD structure 500 comprises an LC layer 502 and a polarizer layer 504. The LCD structure 500 may be globally addressed or may be pixelated. If pixelated, the pixels may be TFT addressed or directly addressed (or addressed by another method). The pixels of the LCD structure 500 may be of an identical geometry to the pixels of the reflective display 100. In other implementations, they may also be larger or smaller.

Figure 11:
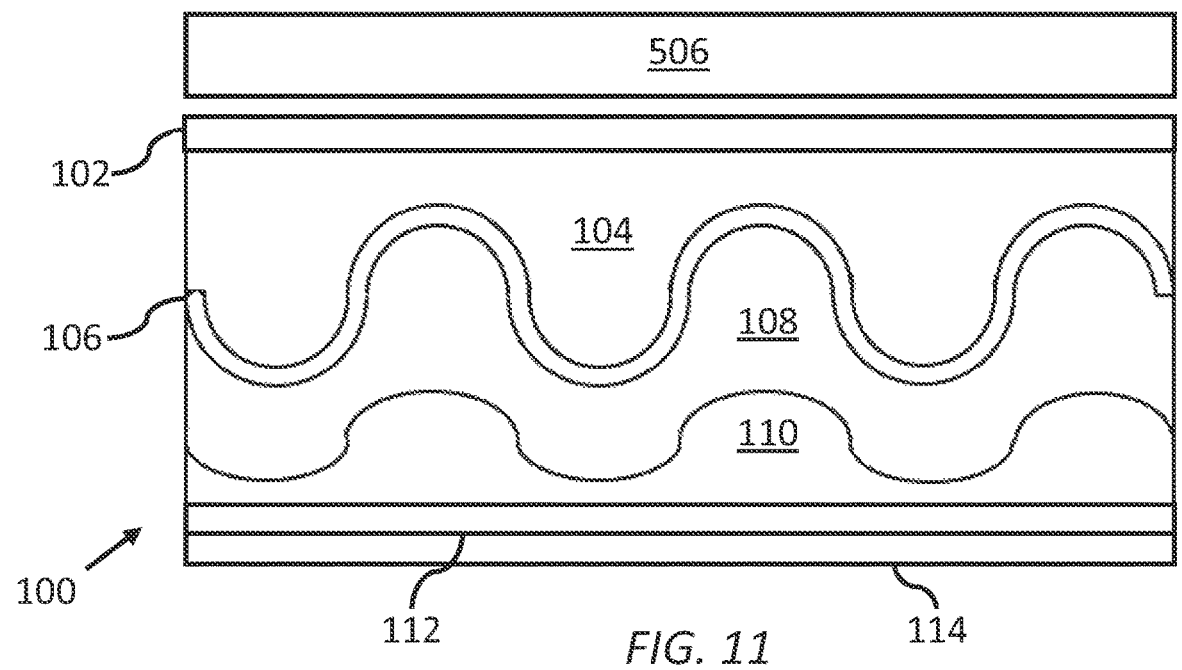
FIG. 11 illustrates a schematic cross-sectional view of the full color reflective display with a guest host LCD on the viewing side in accordance with an example implementation of the present disclosure.

FIG. 11 illustrates a schematic cross-sectional view of the full color reflective display 100, wherein a guest host LCD on the viewing side in accordance with an example implementation of the present disclosure. In FIG. 11, a supplementary guest host LCD structure 506 is placed over the reflective display 100 to achieve a black state in the reflective display 100. As with other guest host LCD structures, guest host LCD structure 506 requires no polarizer. The guest host LCD structure 506 may be a vertical alignment (VA) mode LCD, a fringe-field switching (FFS) mode LCD, an in-plane-switching (IPS) mode LCD, a twisted nematic (TN) mode LCD, or another mode of LCD. The guest host LCD structure 506 may be globally addressed or be pixelated. If pixelated, the pixels may be TFT addressed or directly addressed (or addressed by another method). The pixels of the guest host LCD structure 506 may be of an identical geometry to the pixels of the reflective display 100, or they may be larger or smaller.

Figure 12:
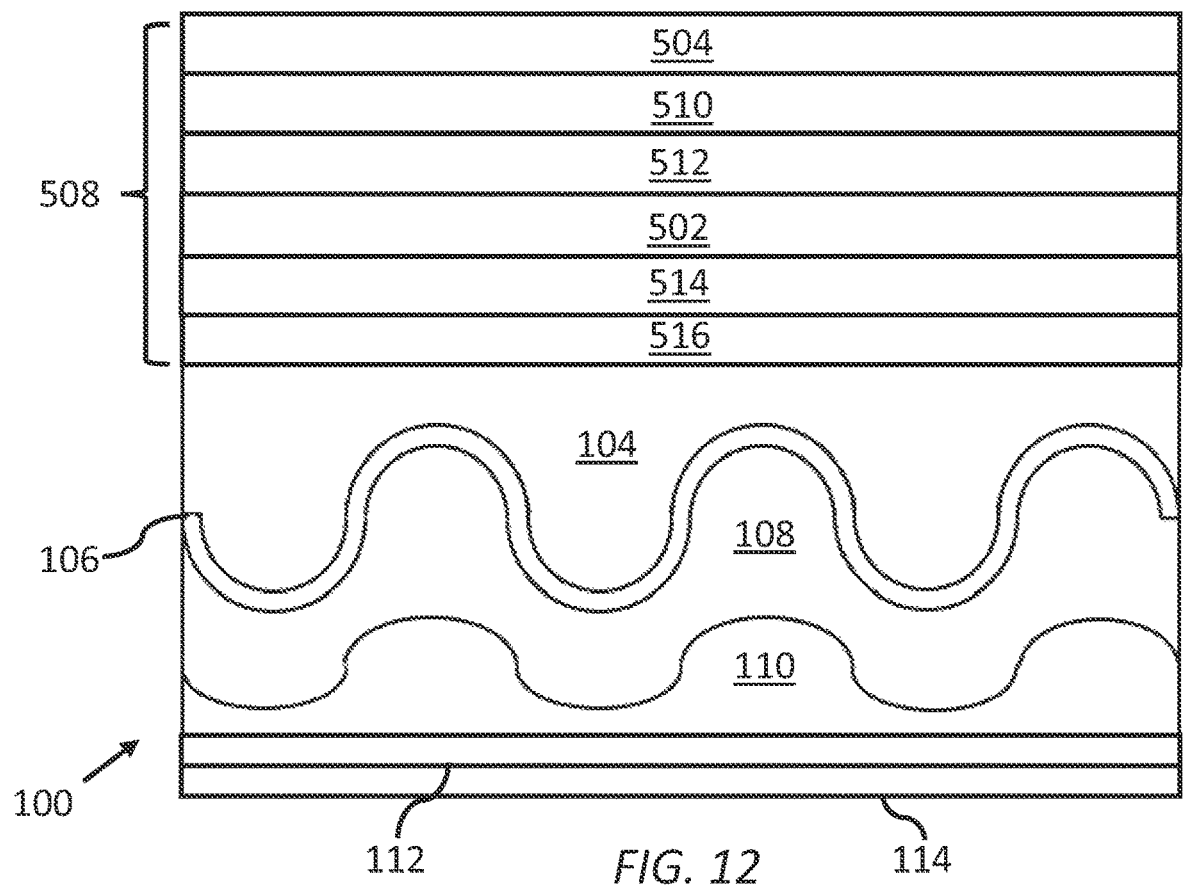
FIG. 12 illustrates a schematic cross-sectional view of the full color reflective display with an "on-cell" LCD on the viewing side in accordance with an example implementation of the present disclosure.

FIG. 12 illustrates a schematic cross-sectional view of the full color reflective display 100, with an on-cell LCD on the viewing side in accordance with an example implementation of the present disclosure. In FIG. 12, a supplementary on-cell LCD structure 508 is placed on the reflective display 100 to enable a black state functionality. The on-cell LCD structure 508 includes a polarizer layer 504, a top electrode substrate 510, a top alignment layer 512, an LC layer 502, a bottom alignment layer 514, and a bottom electrode layer 516. In one implementation, one of the electrode layers (the top electrode layer 510 or the bottom electrode layer 516) may be addressed. Additionally, one of the electrode layers may be an FFS or an IPS style electrode, in which case the other electrode may be omitted.

Figure 13:
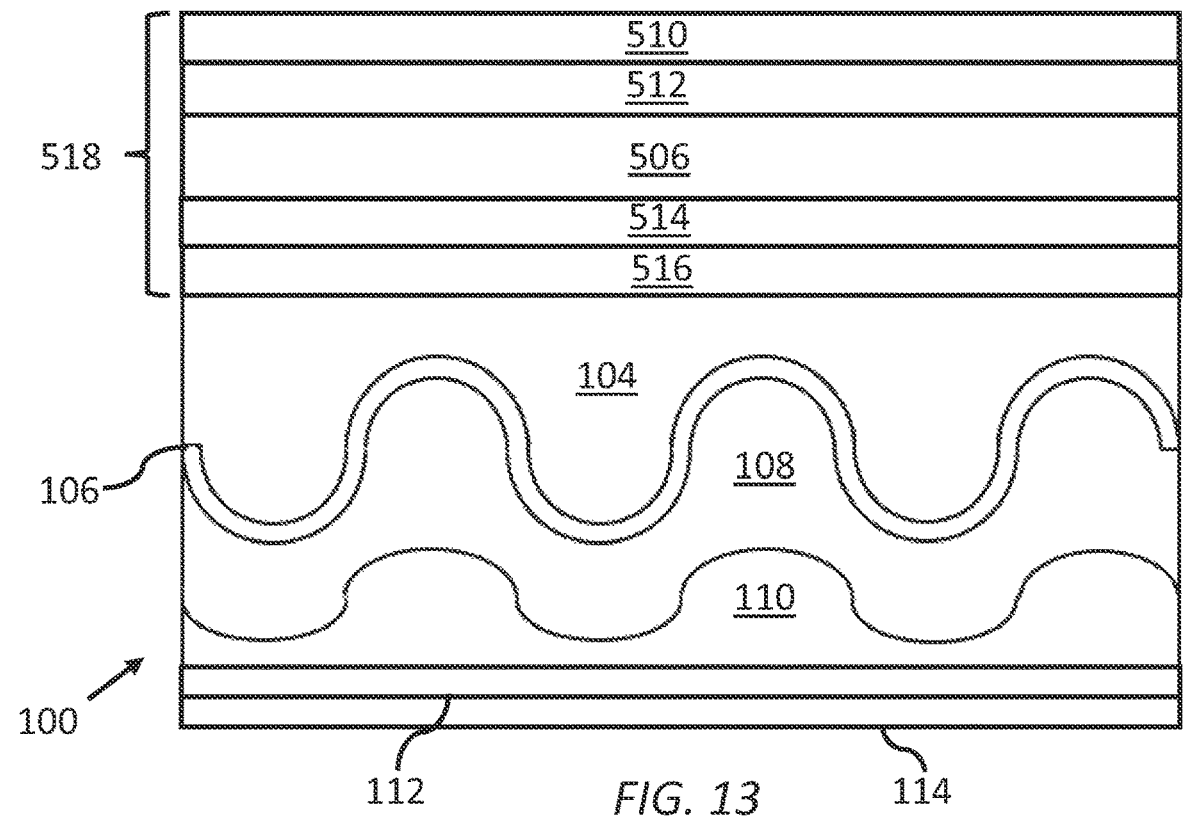
FIG. 13 illustrates a schematic cross-sectional view of the full color reflective display with an "on-cell" guest host LCD on the viewing side in accordance with an example implementation of the present disclosure.

FIG. 13 illustrates a schematic cross-sectional view of the full color reflective display 100, with an on-cell guest host LCD 518 on the viewing side. In FIG. 13, a supplementary on-cell guest host LCD structure 518 is placed on the reflective display 100 to enable a black state functionality. The on-cell guest host LCD structure 518 includes a top electrode layer 510, a top alignment layer 512, a guest host LC layer 506, a bottom alignment layer 514, and a bottom electrode layer 516. As with the on-cell LCD structure 508 of FIG. 12, in this implementation, one of the electrode layers (the top electrode layer 510 or the bottom electrode layer 516) may be addressed. One of the electrode layers may be an FFS or an IPS style electrode, in which case the other electrode may be omitted.

Figure 14:
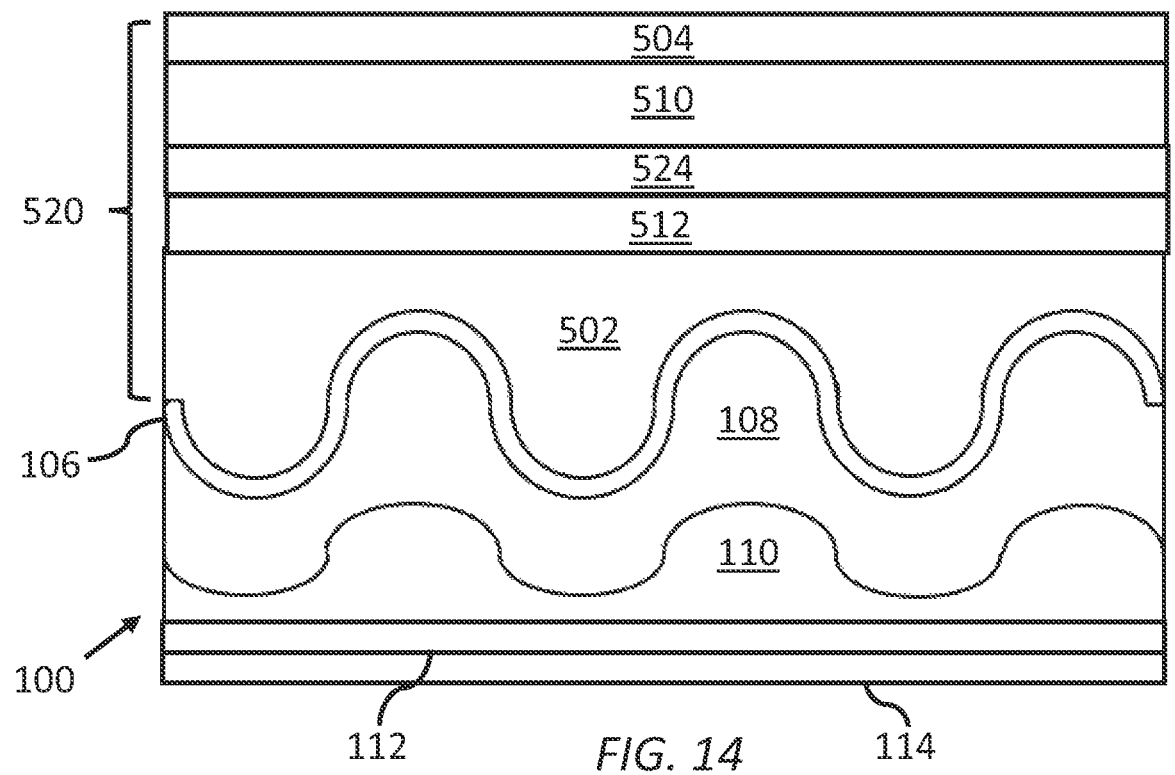
FIG. 14 illustrates a schematic cross-sectional view of the full color reflective display with an "in-cell" LCD on the viewing side in accordance with an example implementation of the present disclosure.

FIG. 14 illustrates a schematic cross-sectional view of the full color reflective display 100, with an in-cell LCD structure 520 on the viewing side in accordance with an example implementation of the present disclosure. In FIG. 14, a supplementary in-cell LCD structure 520 is incorporated into the reflective display 100. In this implementation, the LC layer 502 is under the top electrode layer 510 (forming the top substrate of the reflective display 100), and thus this implementation is thinner than the implementation shown in FIG. 13, reducing crosstalk between pixels. The in-cell LCD structure 520 comprises a polarizer layer 504, the top electrode substrate 510, a top electrode 524, a top alignment layer 512, and the reflective display 100 has a LC layer 502 in lieu of a dielectric layer (ref. nos. 104, 204, 304, and 404 in FIGS. 4-9). In this implementation, the top electrode 524 may be TFT addressed, it may be directly addressed, or it may be globally addressed. Additionally, an alignment layer (not shown) may be included between the LC layer 502 and the textured sub-micron metal film 106.

Figure 15:
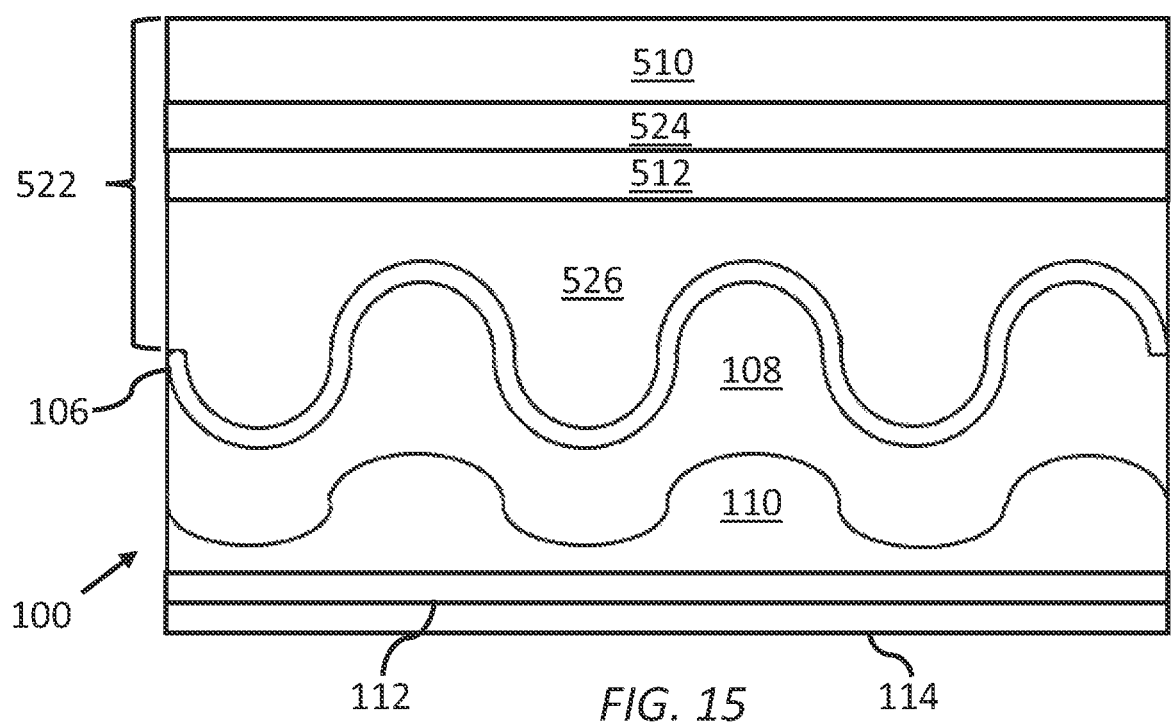
FIG. 15 illustrates a schematic cross-sectional view of the full color reflective display with an "in-cell" guest host LCD on the viewing side in accordance with an example implementation of the present disclosure.

FIG. 15 illustrates a schematic cross-sectional view of the full color reflective display 100, wherein an in-cell guest host LCD on the viewing side in accordance with an example implementation of the present disclosure. In FIG. 15, a supplementary in-cell guest host LCD structure 522 is incorporated into the reflective display 100. The in-cell guest host LCD structure 522 comprises a top electrode substrate 510, a top electrode 524, a top alignment layer 512, and the reflective display 100 has a guest host LC layer 526 in lieu of a dielectric layer (ref. nos. 104, 204, 304, and 404 in FIGS. 4-9). In this implementation, the top electrode 524 may be TFT addressed, it may be directly addressed, or it may be globally addressed. Additionally, an alignment layer (not shown) may be included between the guest host LC layer 526 and the textured sub-micron metal film 106.

The structure and functions of the full color reflective display 100 having been shown and described in various implementations, exemplary methods of assembly will now be discussed.

FIGS. 16-19 illustrate, in flowchart form, various exemplary actions to be taken in fabricating full color reflective displays in accordance with various implementations of the present disclosure. Certain details and features have been left out of these flowcharts that are apparent to a person of ordinary skill in the art. For example, an action may consist of one or more sub-actions or may involve specialized equipment or materials, as known in the art. As illustrated in FIGS. 16-19, actions 602-614, 702-712, 802-814, and 902-912 indicated in flowcharts 600, 700, 800, and 900 are sufficient to describe one implementation of the present disclosure, but other implementations of the present disclosure may utilize actions different from those shown in the flowcharts.

Figure 16:
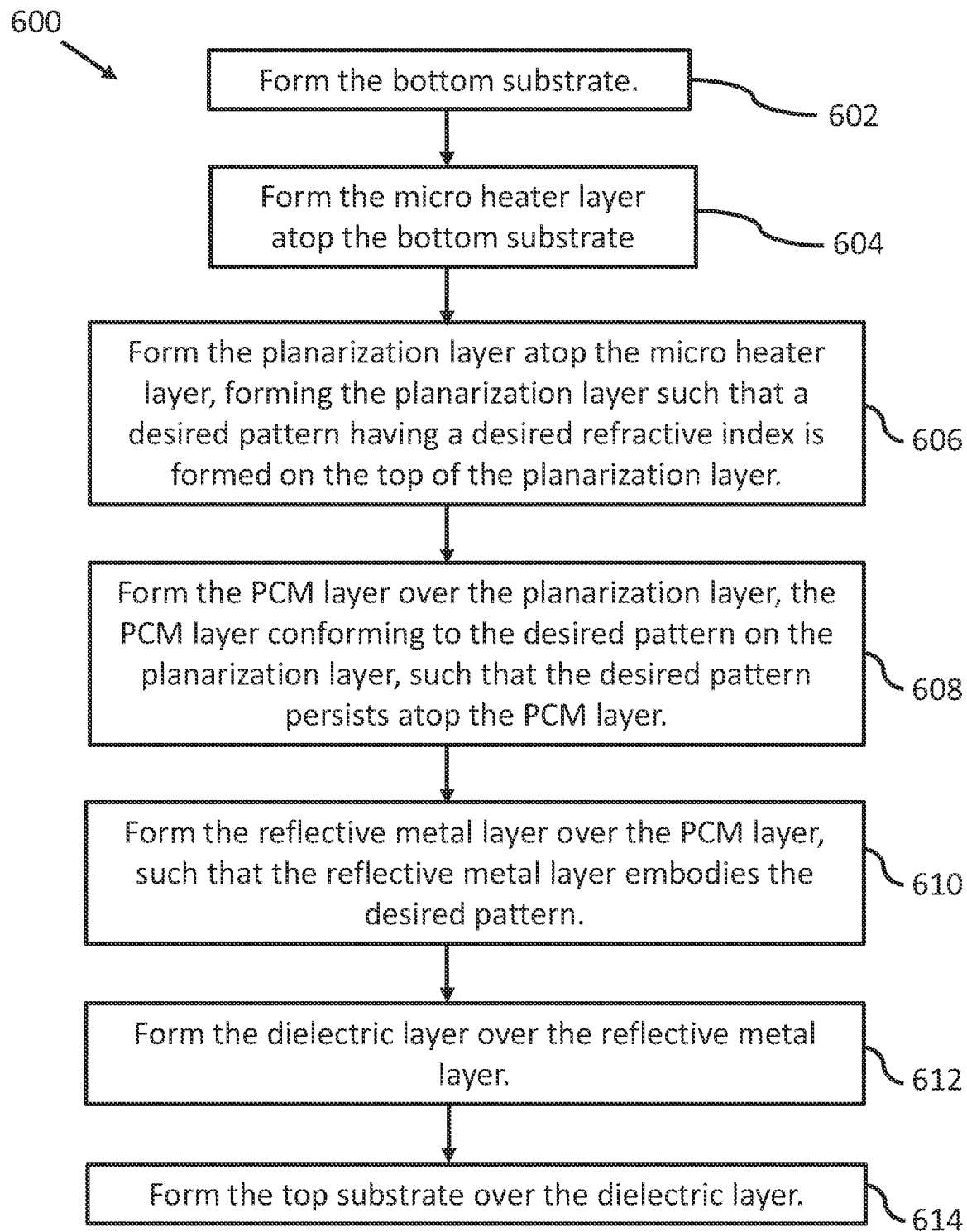
FIG. 16 is a first flowchart illustrating a fabrication method of the full color reflective display in accordance with an example implementation of the present disclosure.

FIG. 16 comprises a flowchart illustrating an exemplary fabrication method of the full color reflective display in accordance with an example implementation of the present disclosure. The flowchart 600 illustrates several actions in preparing the basic exemplary implementation of a full color reflective display 100 (FIG. 4). In action 602, the bottom substrate is formed. In action 604, the microheater layer is then formed atop the bottom substrate. In action 606, the planarization layer is then formed atop the microheater layer. When forming the planarization layer, a desired pattern having a desired refractive index (and reflected color) is formed onto the top of the planarization layer. In action 608, a PCM layer is formed over the planarization layer, the PCM layer conforming to the desired pattern on the planarization layer, such that the desired pattern persists atop the PCM layer. In action 610, the textured sub-micron metal film is formed over the PCM layer, such that the textured sub-micron metal film embodies the desired pattern. In action 612, a dielectric layer is formed over the textured sub-micron metal film. In action 614, the top substrate is formed over the dielectric layer.

Figure 17:
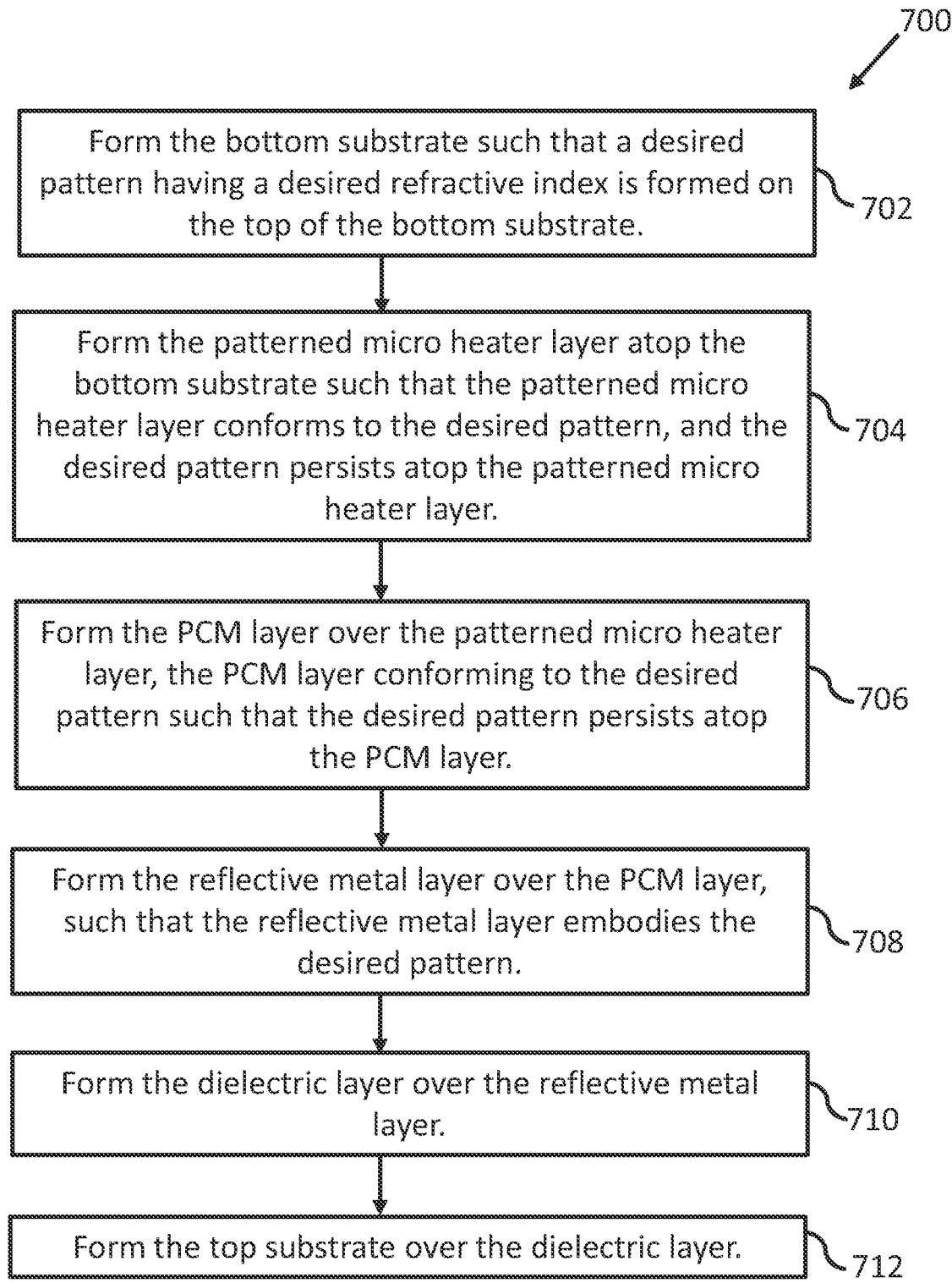
FIG. 17 is a second flowchart illustrating a fabrication method of the full color reflective display in accordance with an example implementation of the present disclosure.

FIG. 17 is a flowchart 700 illustrating a fabrication method of the full color reflective display in accordance with an example implementation of the present disclosure. The flowchart 700 illustrates several actions in preparing the second exemplary implementation of the reflective display 200 (FIG. 7). In action 702, the bottom substrate is formed. When forming the bottom substrate, a desired pattern having a desired refractive index (and reflected color) is formed onto the top of the bottom substrate. Therefore, no planarization layer is needed. In action 704, the patterned microheater layer is formed atop the bottom substrate. The patterned microheater layer conforms to the desired pattern, such that the desired pattern persists atop the patterned microheater layer. In action 706, a PCM layer is formed over the patterned microheater layer. The PCM layer also conforms to the desired pattern such that the desired pattern persists atop the PCM layer as well. In action 708, the textured sub-micron metal film is formed over the PCM layer, such that the textured sub-micron metal film embodies the desired pattern. In action 710, a dielectric layer is formed over the textured sub-micron metal film. In action 712, the top substrate is formed over the dielectric layer.

Figure 18:
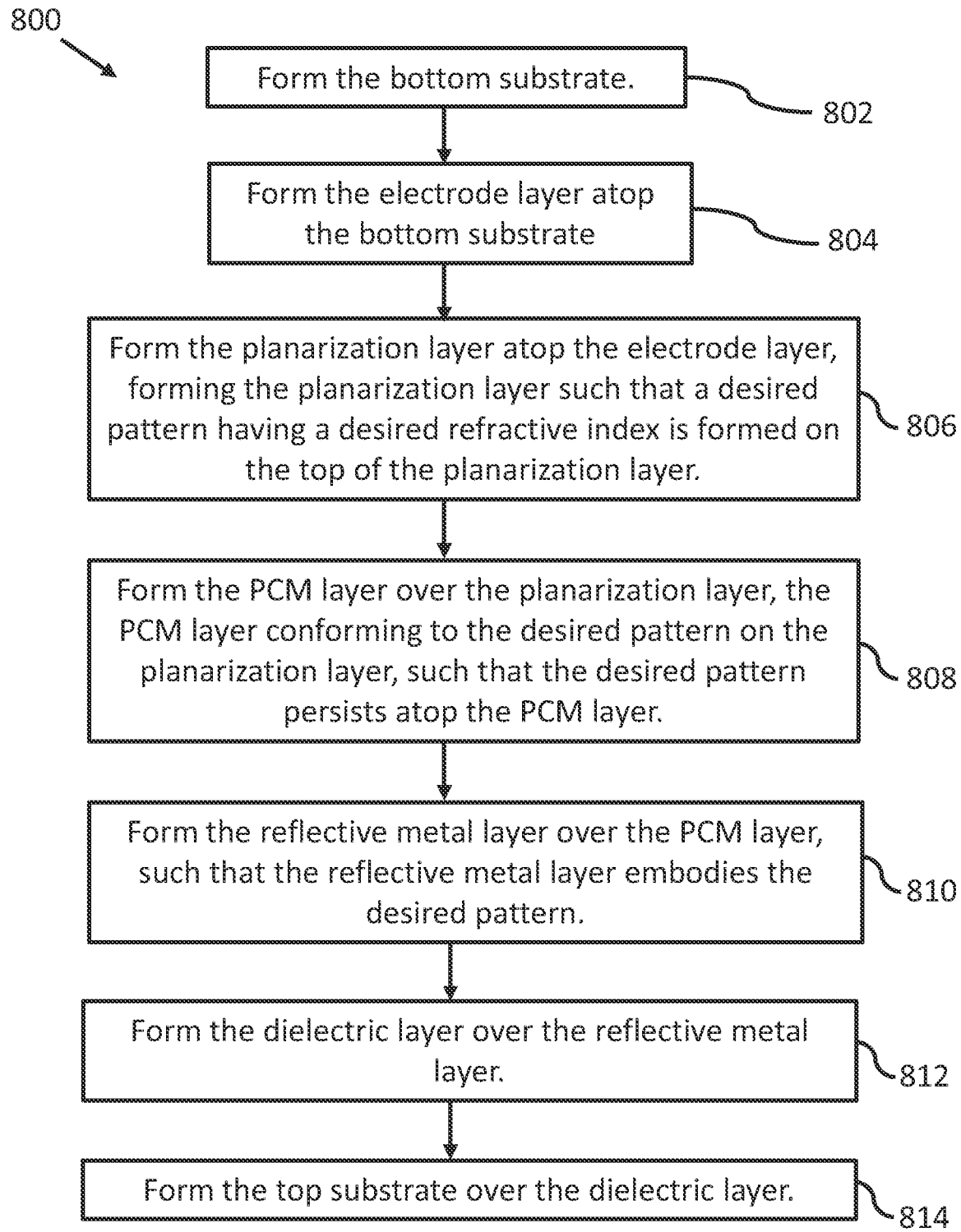
FIG. 18 is a third flowchart illustrating a fabrication method of the full color reflective display in accordance with an example implementation of the present disclosure.

FIG. 18 is a flowchart 800 illustrating a fabrication method of the full color reflective display in accordance with an example implementation of the present disclosure. The flowchart 800 illustrates several actions in preparing the third exemplary implementation of the reflective display 300 (FIG. 8). In action 802, the bottom substrate is formed. In action 804, the electrode layer is formed atop the bottom substrate instead of a microheater. In action 806, the planarization layer is formed atop the electrode layer. When forming the planarization layer, a desired pattern having a desired refractive index (and reflected color) is formed on the top of the planarization layer. In action 808, a PCM layer is formed over the planarization layer, the PCM layer conforming to the desired pattern on the planarization layer, such that the desired pattern persists atop the PCM layer. In action 810 the textured sub-micron metal film is formed over the PCM layer, such that the textured sub-micron metal film embodies the desired pattern. In action 812, a dielectric layer is formed over the textured sub-micron metal film. In action 814, the top substrate is formed over the dielectric layer.

Figure 19:
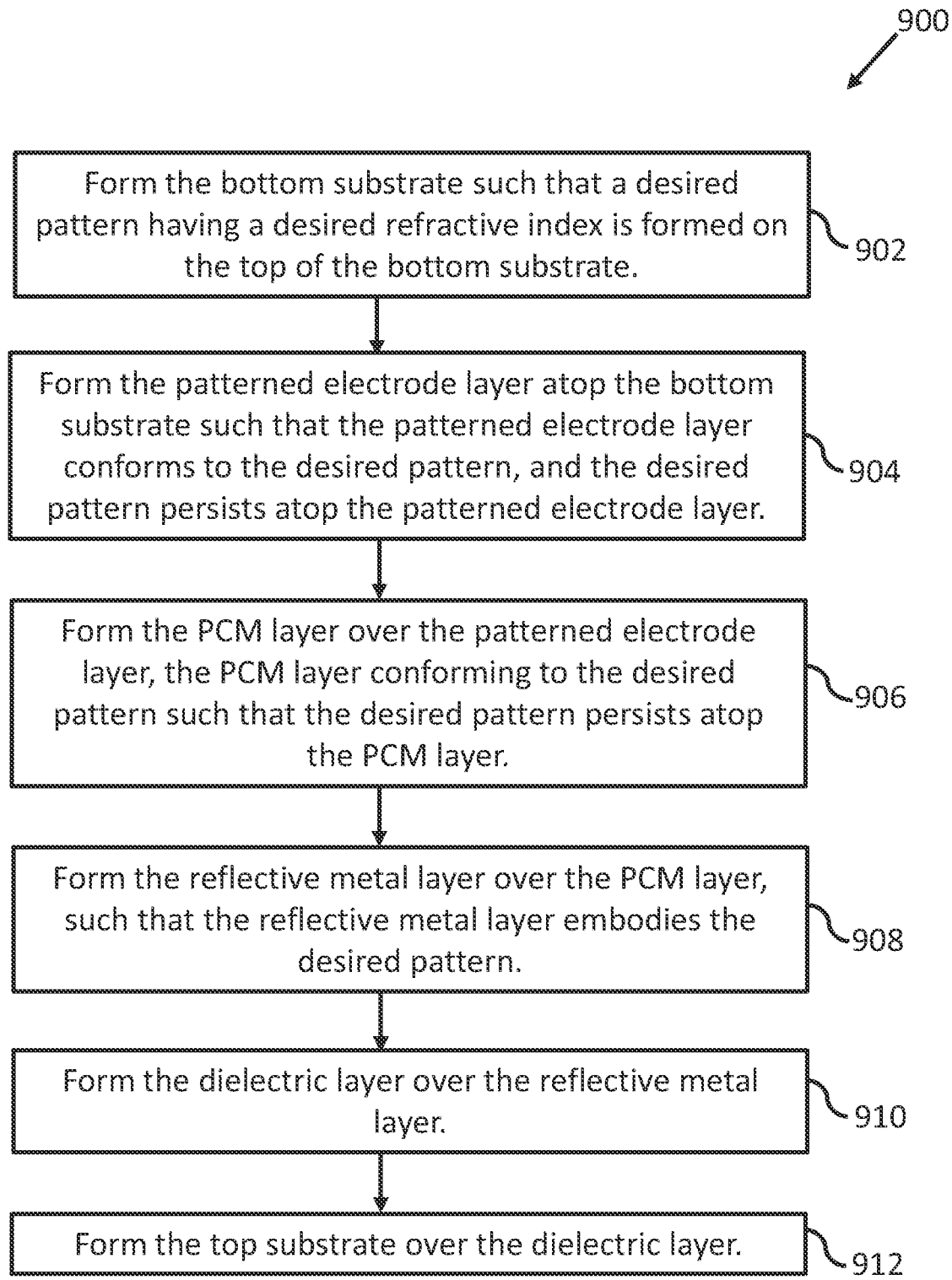
FIG. 19 is a fourth flowchart illustrating a fabrication method of the full color reflective display in accordance with an example implementation of the present disclosure.

FIG. 19 is a flowchart 900 illustrating a fabrication method of the full color reflective display in accordance with an example implementation of the present disclosure. The flowchart 900 illustrates several actions in preparing the fourth exemplary implementation of the reflective display 400 (FIG. 9). In action 902, the bottom substrate is formed. When forming the bottom substrate, a desired pattern having a desired refractive index (and reflected color) is formed on the top of the bottom substrate. Therefore, no planarization layer is needed. In action 904, the patterned electrode layer is formed atop the bottom substrate instead of a microheater. The patterned electrode layer conforms to the desired pattern, such that the desired pattern persists atop the patterned electrode layer. In action 906, a PCM layer is formed over the patterned electrode layer. The PCM layer also conforms to the desired pattern such that the desired pattern persists atop the PCM layer as well. In action 908, the textured sub-micron metal film is formed over the PCM layer, such that the textured sub-micron metal film embodies the desired pattern. In action 910, the dielectric layer is formed over the textured sub-micron metal film. In action 912, the top substrate is formed over the dielectric layer.

In each of the implementations described in FIGS. 16-19, any of the supplementary LCD structures shown in FIGS. 10-15 (the LCD structure 500, guest host LCD structure 506, on-cell LCD structure 508, on-cell guest host LCD structure 518, in-cell LCD structure 520, and in-cell guest host LCD structure 522) may be included atop or incorporate in each of the various reflective displays (ref. nos. 100, 200, 300, and/or 400 in FIGS. 4-9).

From the present disclosure, various techniques may be used for implementing the concepts described in the present disclosure without departing from the scope of those concepts. While the concepts have been described with specific reference to certain implementations, a person of ordinary skill in the art may recognize that changes may be made in form and detail without departing from the scope of those concepts.

As such, the described implementations are to be considered in all respects as illustrative and not restrictive. It should also be understood that the present disclosure is not limited to the implementations described but rather many rearrangements, modifications, and substitutions are possible without departing from the scope of the present disclosure.

What is claimed is:

1. A reflective display apparatus, comprising, from a viewing side:
    a textured sub-micron metal film textured in a periodic manner;
    a phase change material (PCM) layer;
    a phase change control layer configured to change reflection properties of the textured sub-micron metal film by causing the PCM layer to switch between at least two of a plurality of phases; and
    a planarization layer is disposed between the phase change control layer and the PCM layer, wherein:
    the planarization layer is topographically flat at an interface of the planarization layer and the phase change control layer, and
    at an interface of the planarization layer and the PCM layer, the planarization layer conforms to a topology of the textured sub-micron metal film.

2. The reflective display apparatus of claim 1, wherein:
    the phase change control layer comprises an electrode layer, and the PCM is switchable between at least one amorous state and at least one crystalline state when an electric potential is applied between the electrode layer and the textured sub-micron metal film.

3. The reflective display apparatus of claim 1, wherein the phase change control layer comprises a microheater.

4. The reflective display apparatus of claim 1, wherein a dielectric layer is disposed on the viewing side of the textured sub-micron metal film.

5. The reflective display apparatus of claim 1, wherein the phase change control layer is topographically flat at an interface between the PCM layer and the phase change control layer, and at an interface between the PCM layer and the textured sub-micron metal film, wherein the PCM layer conforms to a topology of the textured sub-micron metal film.

6. The reflective display apparatus of claim 1, wherein the phase change control layer is textured in a periodic manner that conforms to the textured sub-micron metal film.

7. The reflective display apparatus of claim 1, wherein:
a height variation of the textured sub-micron metal film in a first direction (z-direction) has a first period in a second direction (x-direction) perpendicular to the first direction.

8. The reflective display apparatus of claim 7, wherein the height variation of the textured sub-micron metal film in the first direction (z-direction) has a second period in a third direction (y-direction) perpendicular to the first and second directions.

9. The reflective display apparatus of claim 8, wherein the first period is different from the second period.

10. The reflective display apparatus of claim 8, wherein the first period is the same as the second period.

11. The reflective display apparatus of claim 1, further comprising a liquid crystal display (LCD) on a viewing side of the reflective display apparatus.

12. The reflective display apparatus of claim 11, further comprising a polarizer on the LCD.

13. The reflective display apparatus of claim 1, further comprising a guest host liquid crystal display (LCD) on a viewing side of the reflective display apparatus.

14. The reflective display apparatus of claim 1, further comprising:
an on-cell LCD structure on a viewing side of the reflective display apparatus,
wherein the on-cell LCD structure includes:
a polarizer;
a first electrode layer;
a top alignment layer;
a liquid crystal (LC) layer;
a bottom alignment layer; and
a second electrode layer,
wherein liquid crystals of the LC layer are reoriented via an application of a voltage between the first and second electrode layers.

15. The reflective display apparatus of claim 1, further comprising:
an on-cell LCD structure on a viewing side of the reflective display apparatus,
wherein the on-cell LCD structure includes:
a polarizer;
a top electrode substrate;
a first electrode layer;
a top alignment layer;
a liquid crystal (LC) layer; and
a bottom alignment layer,
wherein liquid crystals of the LC layer are reoriented via an application of a voltage between the first electrode layer and the textured sub-micron metal film.

16. The reflective display apparatus of claim 1, further comprising:
an on-cell guest host LCD structure on a viewing side of the reflective display apparatus,
wherein the on-cell guest host LCD structure includes:
a top electrode substrate;
a first electrode layer;
a top alignment layer;
a liquid crystal (LC) layer;
a bottom alignment layer; and
a second electrode layer,
wherein the LC layer is doped with a dichroic dye and liquid crystals of the LC layer are reoriented via an application of a voltage between the first and second electrode layers.

17. The reflective display apparatus of claim 1, further comprising:
an on-cell LCD structure on a viewing side of the reflective display apparatus,
wherein the on-cell LCD structure includes:
a polarizer;
a top electrode substrate;
a first electrode layer;
a top alignment layer;
a liquid crystal (LC) layer; and
a bottom alignment layer,
wherein the LC layer is doped with a dichroic dye and liquid crystals of the LC layer are reoriented via an application of a voltage between the first electrode layer and the textured sub-micron metal film.

18. The reflective display apparatus of claim 1, further comprising:
an on-cell in-plane-switching (IPS) type LCD structure on a viewing side of the reflective display apparatus,
wherein the on-cell IPS type LCD structure includes:
a polarizer;
a top electrode substrate;
a first electrode layer;
an electrical insulation layer;
a second electrode layer;
a top alignment layer;
a liquid crystal (LC) layer; and
a bottom alignment layer,
wherein liquid crystals of the LC layer are reoriented via an application of a voltage between the first and second electrode layers.

19. The reflective display apparatus of claim 1, further comprising:
an on-cell IPS guest host type LCD structure on a viewing side of the reflective display apparatus,
wherein the on-cell IPS guest host type LCD structure includes:
a top electrode substrate;
a first electrode layer;
an electrical insulation layer;
a second electrode layer;
a top alignment layer;
a liquid crystal (LC) layer; and
a bottom alignment layer,
wherein the LC layer is doped with a dichroic dye and liquid crystals of the LC layer are reoriented via an application of a voltage between the first and second electrode layers.

20. The reflective display apparatus of claim 1, wherein the PCM layer includes germanium-antimony-tellurium (GeSbTe).

21. The reflective display apparatus of claim 1, wherein the PCM layer is switchable between an amorphous state and a crystalline state.

* * * * *